(12) United States Patent
Takamizawa

(10) Patent No.: US 11,309,771 B2
(45) Date of Patent: Apr. 19, 2022

(54) COOLING JACKET AND COOLING UNIT

(71) Applicant: FANUC CORPORATION, Yamanashi (JP)

(72) Inventor: Suguru Takamizawa, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 196 days.

(21) Appl. No.: 16/874,278

(22) Filed: May 14, 2020

(65) Prior Publication Data
US 2020/0412207 A1    Dec. 31, 2020

(30) Foreign Application Priority Data
Jun. 28, 2019 (JP) .............................. JP2019-121872

(51) Int. Cl.
*H02K 9/19* (2006.01)
*H02K 9/14* (2006.01)

(52) U.S. Cl.
CPC ................. *H02K 9/19* (2013.01); *H02K 9/14* (2013.01)

(58) Field of Classification Search
CPC .. H02K 9/16; H02K 9/19; H02K 9/18; H02K 9/197; H02K 9/20; H02K 9/06; H02K 9/14; H02K 5/20; H02K 5/02; H02K 5/04; H02K 5/08
See application file for complete search history.

(56) References Cited

U.S. PATENT DOCUMENTS

2011/0221287 A1* 9/2011 Lucchi ..................... H02K 3/24
310/54

FOREIGN PATENT DOCUMENTS

JP        2010-268667 A    11/2010

* cited by examiner

*Primary Examiner* — Bryan R Perez
(74) *Attorney, Agent, or Firm* — Nakanishi IP Associates, LLC

(57) ABSTRACT

A cooling jacket has cooling units coupled in a row. The cooling unit comprises a plate-shaped cooling unit body with flow channel, a socket joint extending from one end of the flow channel, and a spigot joint extending from one end of the flow channel. The spigot joint is fitted to the socket joint to connect the cooling units to each other. The socket joint has a spherical-shaped inner surface, and the spigot joint has a spherical-shaped outer surface that matches the inner surface of the socket joint to detachably connect the cooling units to each other and be rotatable about an axis orthogonal to a coupling direction of the cooling units. The socket joint and the spigot joint are provided with through-holes that penetrate through the socket joint and the spigot joint, respectively, to communicate with the flow channels of the cooling units.

14 Claims, 23 Drawing Sheets

COOLING JACKET AND COOLING UNIT

CROSS-REFERENCE TO RELATED APPLICATIONS

This application is based upon and claims the benefit of priority from the Japanese Patent Application No. 2019-121872, filed Jun. 28, 2019 the entire contents of which are incorporated herein by reference.

FIELD

Embodiments of the present invention relate to a cooling jacket and a cooling unit.

BACKGROUND

When an electric motor is driven, heat is generated by internal loss, and the temperature of the electric motor is increased. When the temperature of the electric motor is increased, there are possibilities that deterioration of an insulating material inside the electric motor is hastened, burnout of the insulating material occurs, and a bearing, a rectifier, etc. are damaged. In order to suppress the temperature increase of the electric motor by generation of heat, the technology is known that provides a cooling structure to the outer side of the electric motor. For example, see Patent Literature 1.

CITATION LIST

Patent Literature

Japanese Unexamined Patent Application Publication No. 2010-268667

SUMMARY

Technical Problem

In order to exhibit a similar high cooling effect to any of electric motors having different contour shapes, it is desired for the cooling structure for cooling an electric motor to be able to be assembled to these electric motors with a high adhesion property. Additionally, in order to achieve an improvement in maintenance property and a reduction of replacement costs, a structure is desired that, even when a fault occurs in a part of the cooling structure, only requires replacement of the part where the fault occurs, and does not require replacement of the whole cooling structure. Further, it is desired to be able to provide the cooling structure such that, even when there is a variation in heat distribution within the electric motor, the thickness of a portion where heat is accumulated is particularly increased.

Solution to Problem

One aspect of the present disclosure relates to an electric motor cooling jacket 1 has a plurality of cooling units coupled in a row. Each of the cooling units comprises a plate-shaped cooling unit body including therein a flow channel, a socket joint attached to the cooling unit body to extend from one end of the flow channel; and a spigot joint attached to the cooling unit body to extend from one end of the flow channel. The spigot joint is fitted to the socket joint to connect the cooling units to each other. The socket joint has a spherical-shaped or cylindrical inner surface, and the spigot joint has a spherical-shaped or cylindrical outer surface that matches the inner surface of the socket joint to detachably connect the cooling units to each other and be rotatable about an axis orthogonal to a coupling direction of the cooling units. The socket joint and the spigot joint are provided with through-holes that penetrate through the socket joint and the spigot joint, respectively, to communicate with the flow channels of the cooling units.

One aspect of the present disclosure relates to a cooling unit constituting an electric motor cooling jacket for cooling an electric motor. The cooling unit comprises a plate-shaped cooling unit body including therein a flow channel for a cooling medium, a socket joint attached to the cooling unit body to extend from one end of the flow channel, and a spigot joint attached to the cooling unit body to extend from one end of the flow channel. The spigot joint is fitted to the socket joint to connect the cooling unit to another cooling unit. The socket joint has a spherical-shaped or cylindrical inner surface, and the spigot joint has a spherical-shaped or cylindrical outer surface that matches the inner surface of the socket joint to detachably connect the cooling unit to the another cooling unit and be rotatable about an axis orthogonal to a coupling direction of the cooling unit to the another cooling unit. The socket joint and the spigot joint are provided with through-holes that penetrate through the socket joint and the spigot joint, respectively, to communicate with the flow channels of the cooling unit and the another cooling unit.

According to one aspect, it is possible to provide an assembly-type cooling jacket excellent in adhesion property and maintenance property.

DETAILED DESCRIPTION

Hereinafter, embodiments of the present disclosure will be listed with reference to the drawings. Cooling jackets according to first, second, and third embodiments are used for cooling an electric motor. The cooling jackets according to the first, second, and third embodiments have almost common structures, but are different from each other in the contour shapes of the cooling units that constitute the cooling jackets. The first embodiment typically relates to the cooling jacket that can be preferably used to an electric motor whose contour forms a polygonal column. The second embodiment typically relates to the cooling jacket that can be preferably used to the electric motor whose contour forms a polygonal pyramid. The third embodiment typically relates to the cooling jacket that can be preferably used to the electric motor whose contour forms a cylindrical body.

First Embodiment

Hereinafter, referring to FIG. 1 to FIG. 15, the cooling jacket according to the first embodiment will be described.

Figure 1:
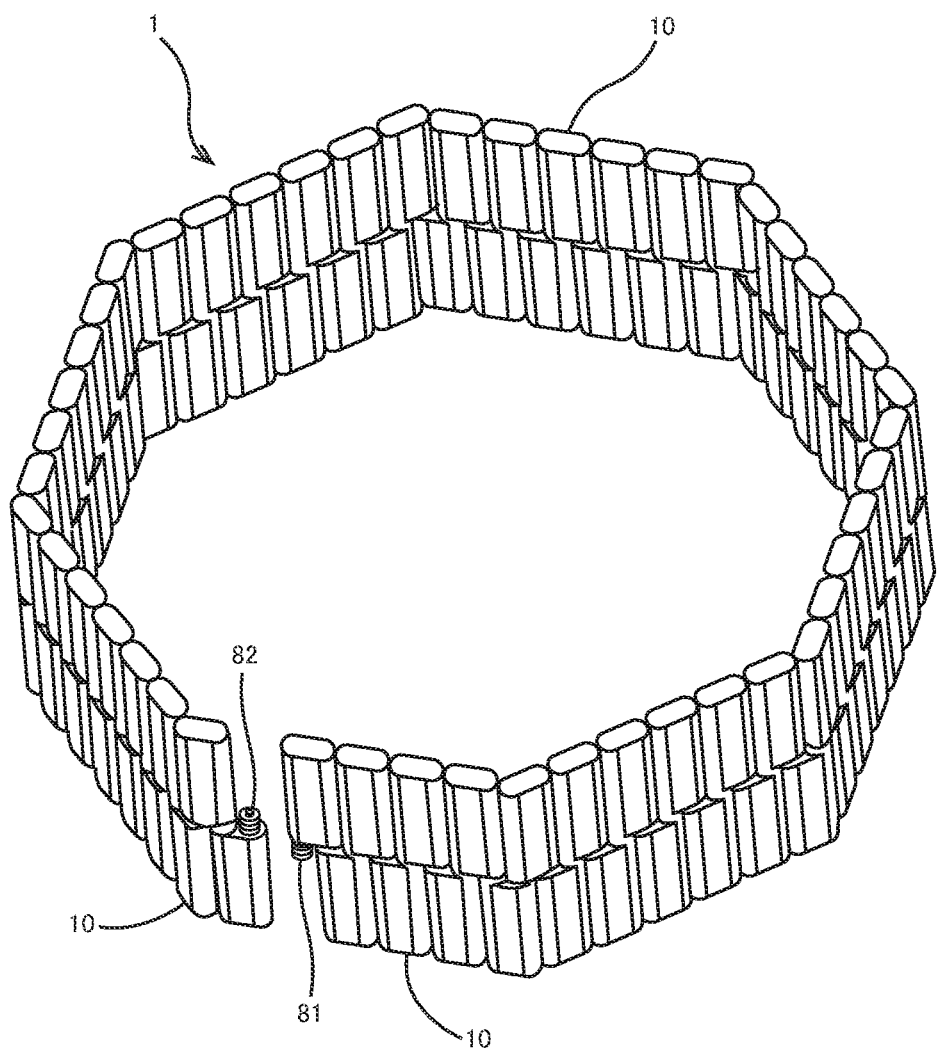
FIG. 1 is a perspective view illustrating a cooling jacket according to a first embodiment.

As illustrated in FIG. 1, a cooling jacket 1 according to the first embodiment is formed by coupling a plurality of cooling units 10 having the same shape and size to each other. The cooling unit 10 forming one end of the cooling jacket 1 includes a joint 81 for refrigerant inflow, and is connected to a refrigerant supplying apparatus outside an electric motor M via the joint 81. The cooling unit 10 forming the other end of the cooling jacket 1 includes a joint 82 for refrigerant outflow, and is connected to a refrigerant processing apparatus outside the electric motor M via the joint 82. A cooling medium, such as a coolant, generated by the refrigerant supplying apparatus is introduced into a flow channel inside the foremost cooling unit 10 via the joint 81 for refrigerant inflow, and is discharged to the refrigerant processing apparatus via the joint 82 for refrigerant outflow of the rearmost cooling unit 10, after sequentially traveling through flow channels inside the plurality of cooling units 10. By circulating the cooling medium through the flow channels inside the cooling units, heat is taken away from the surface of the electric motor M, and the electric motor M is cooled. Note that the cooling medium circulated through the flow channels is not limited to a liquid, and may be a gas.

Figure 2:
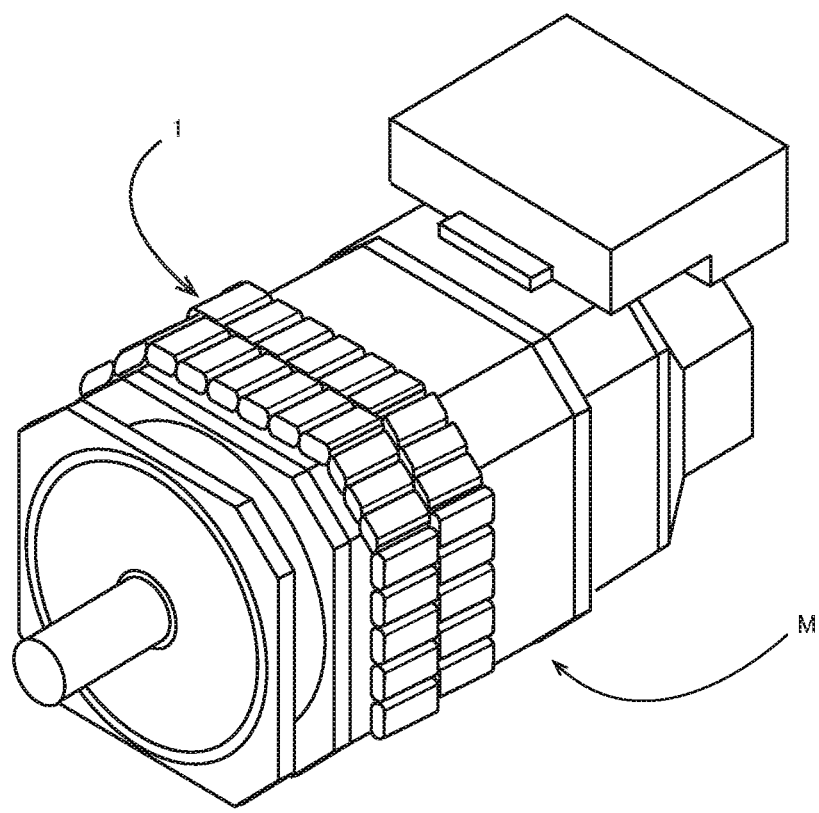
FIG. 2 is a perspective view illustrating a usage example of the cooling jacket of FIG. 1.

As illustrated in FIG. 2, the cooling jacket 1 according to the first embodiment is deformable along, for example, a polygonal-shaped outer periphery surface of the electric motor M, which is a polygonal column, and can closely contact almost the entire surface of the outer periphery surface. An improvement in the cooling effect for the electric motor M by the cooling jacket 1 can be expected, since the cooling jacket 1 can closely contact the outer periphery surface of the electric motor M.

Figure 3:
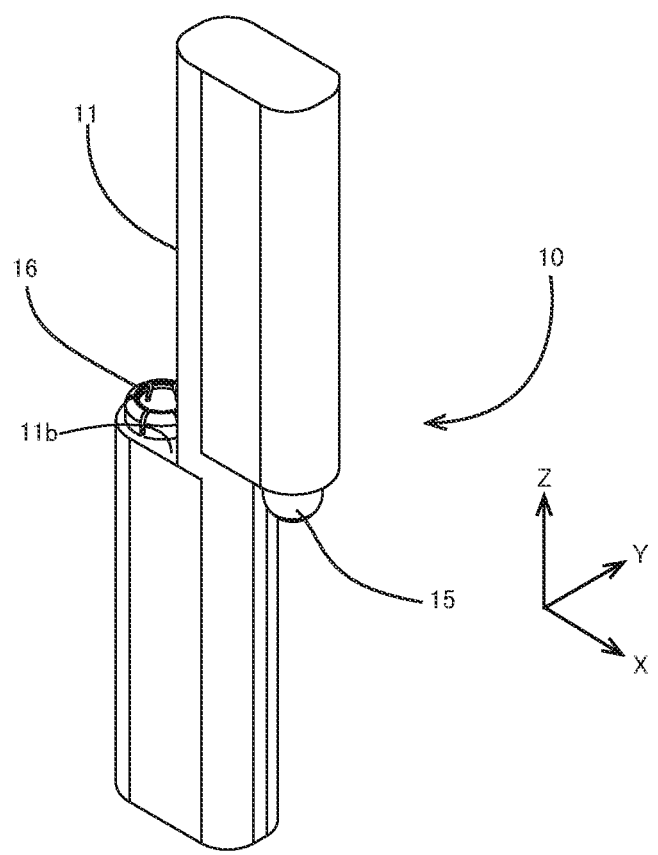
FIG. 3 is a perspective view illustrating a cooling unit of FIG. 1.
Figure 6:
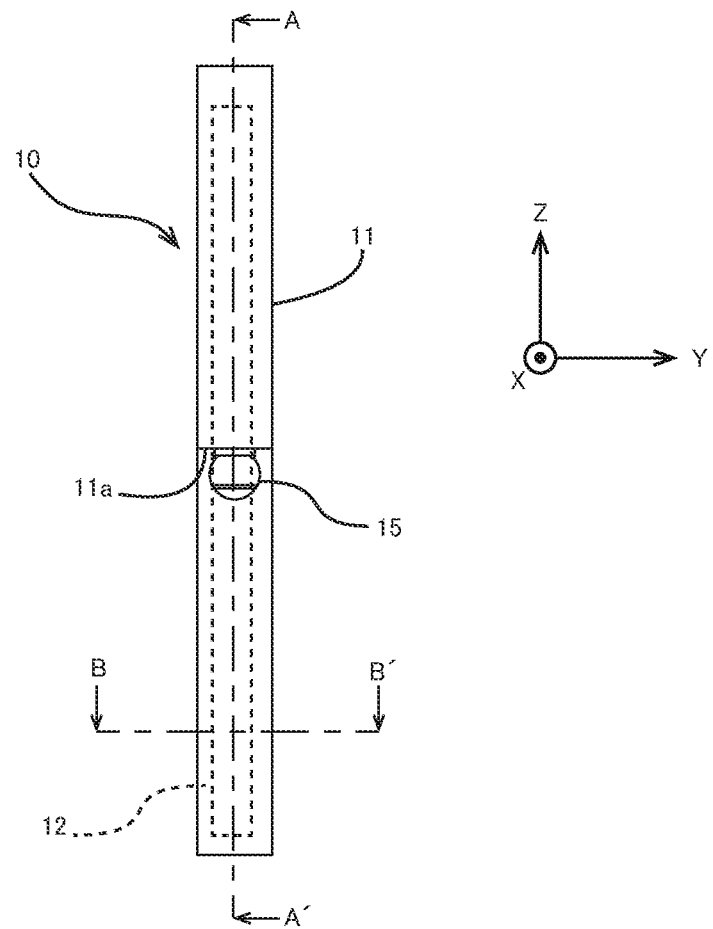
FIG. 6 is a side view of the cooling unit of FIG. 3.

As illustrated in FIG. 3 and FIG. 6, the cooling unit 10 constituting the cooling jacket 1 has a generally strip plate shape. Hereinafter, an X axis is used as the short axis direction of a cooling unit body 11, a Y axis is used as the thickness direction of the cooling unit body 11, and a Z axis is used as the long axis direction of the cooling unit body 11 as appropriate. Note that the cooling units 10 are coupled to each other in a row along the X axis.

Figure 4:
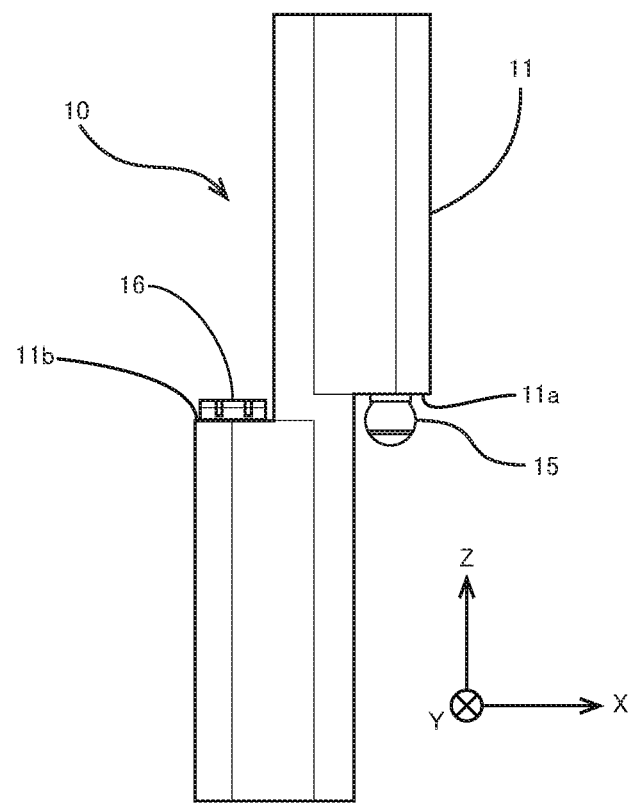
FIG. 4 is a front view of the cooling unit of FIG. 3.

As illustrated in FIG. 4, the cooling unit body 11 has a substantially Z-shape in front view. The portion of the left side of the cooling unit body 11 above the vicinity of the center in relation to the long axis direction is shifted to the right side, and a step is provided. The portion of the opposite side, i.e., the right side below the vicinity of the center in relation to the long axis direction is shifted by the same distance to the left side, and a step is provided. In this manner, the cooling unit body 11 is provided with the steps in the opposite left and right directions. The widths of step surfaces 11a and 11b of the steps on both left and right sides are the same, and have, for example, about ⅓ of the total width of the cooling unit body 11. By providing the cooling unit body 11 with the steps shifted to the opposite left and right directions by the same distance, the cooling unit bodies 11 can be densely arranged by engaging the steps to each other. Since a cooling surface is increased by the dense arrangement of the cooling unit bodies 11, an improvement in the cooling capability of the cooling jacket 1 can be expected. Note that the step surface 11a on the right side and the step surface 11b on the left side of the cooling unit body 11 are arranged at positions near the center in relation to the long axis direction. In practice, in order to provide connection margins for joints 15 and 16 described later, the step surfaces 11a and 11b are slightly shifted to each other in the directions in which they are separated up and down.

Figure 5:
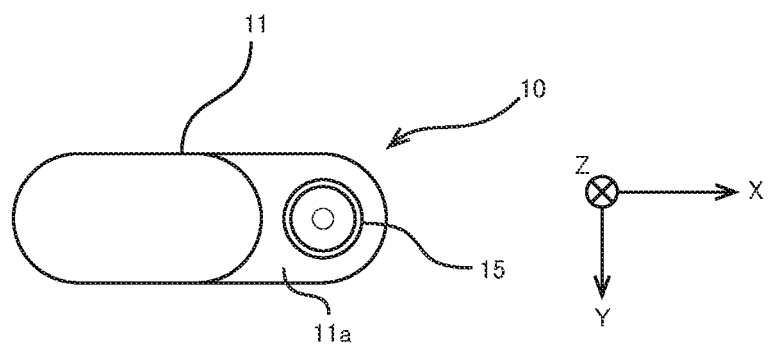
FIG. 5 is a plan view of the cooling unit of FIG. 3.

As illustrated in FIG. 5, the both side surfaces of the cooling unit body 11 are chamfered into arc shapes. A cross section of the cooling unit body 11 forms an oval shape. Accordingly, free rotation of the cooling unit bodies 11 is achieved without interference between the opposing side surfaces of the cooling unit bodies 11 adjacent to each other.

Figure 7:
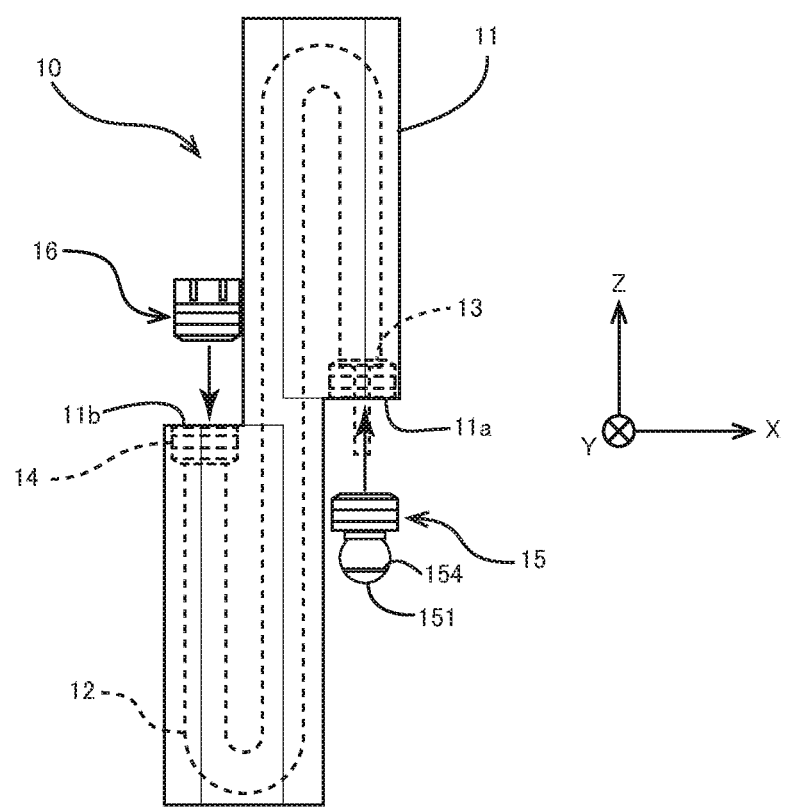
FIG. 7 is an exploded view of the cooling unit of FIG. 3.

As illustrated in FIG. 3 and FIG. 7, the right and left step surfaces 11a and 11b are formed to be parallel to the coupling direction of the cooling units 10 (X-axis direction) and the thickness direction of the cooling unit body 11 (Y-axis direction), in other words, to be orthogonal to the long axis direction (Z-axis direction). A spigot joint 15 and a socket joint 16 are perpendicularly attached to the right and left step surfaces 11a and 11b, respectively. Specifically, in one step surface 11a, a spigot joint insertion hole 13 is formed to be perpendicular to the step surface 11a. The inner surface of this spigot joint insertion hole 13 is threaded, and the spigot joint 15 is screwed therein. Similarly, in the other step surface 11b, a socket joint insertion hole 14 is formed to be perpendicular to the step surface 11b. The socket joint 16 is screwed into this socket joint insertion hole 14. Note that the spigot joint 15 and the socket joint 16 may be attached to the right and left step surfaces 11a and 11b in an inclined direction with respect to the axis that is orthogonal to these surfaces, respectively. In this case, the direction in which the socket joint 16 is installed to the spigot joint 15 of the cooling unit 10 is inclined with respect to the axis that is orthogonal to the coupling direction.

Figure 8:
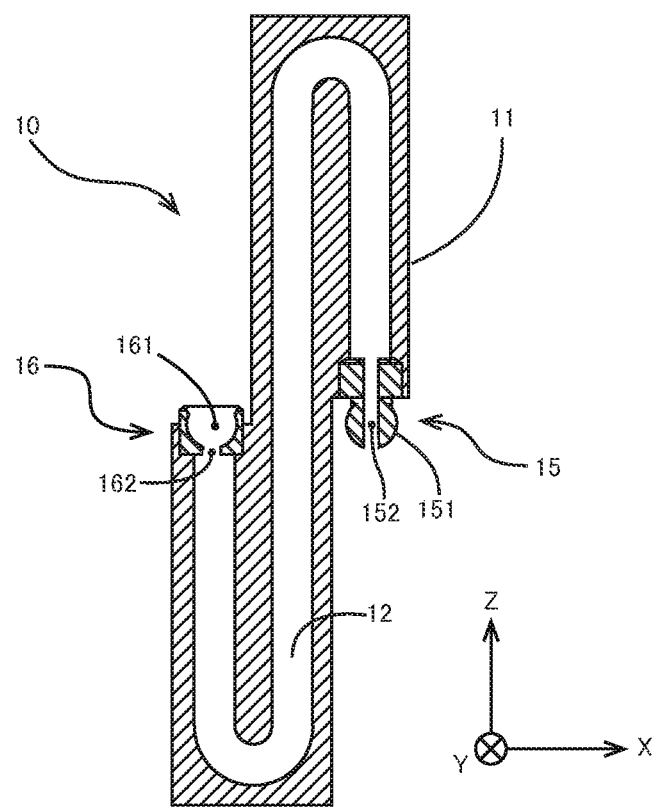
FIG. 8 is an A-A' end elevation view of FIG. 6.
Figure 9:
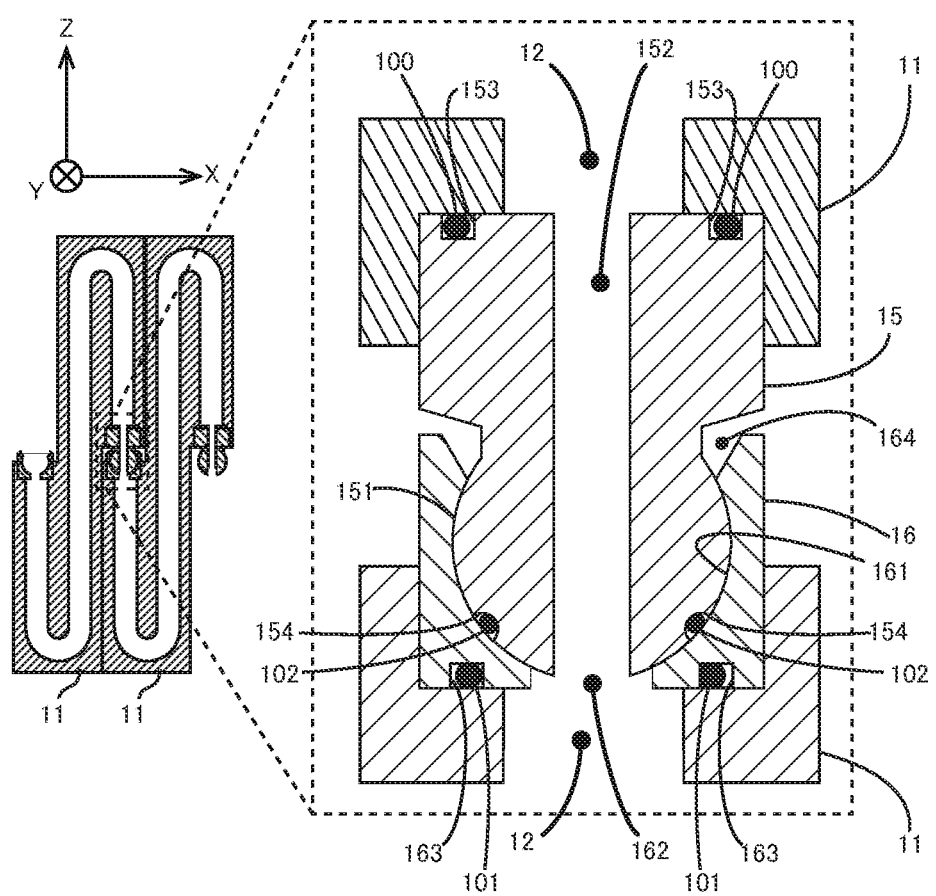
FIG. 9 is an end elevation view illustrating coupling portions of the cooling units.

As illustrated in FIG. 7, FIG. 8, and FIG. 9, the spigot joint 15 includes a protrusion 151 having a spherical-shaped outer surface, and the socket joint 16, which receives the protrusion 151, is provided with a concave portion 161 having a spherical-shaped inner surface that matches the protrusion 151 of the spigot joint 15. The spigot joint 15 and the socket joint 16 form a so-called universal joint structure. These spigot joint 15 and socket joint 16 are made of a resin that is deformable to a certain degree, and an opening 164 of the concave portion 161 has a circular shape having a diameter smaller than the diameter of the protrusion 151, and is formed to have a tapered cross-section shape whose diameter is gradually increased toward the end. Accordingly, the protrusion 151 can be inserted into the concave portion 161 by human power, the protrusion 151 can also be pulled out from the concave portion 161 by human power, and the fitting state can be maintained while securing at least the rotation about the Z axis when not receiving a strong external force. That is, as illustrated in FIG. 11, the cooling jacket 1 can be bendable about an axis Rz that is orthogonal to the coupling direction, by adopting the side shapes and the universal joint structure of the cooling unit body 11.

According to the above-described joint structure, bendable coupling can be achieved by fitting the spigot joint 15 of the cooling unit 10 to the socket joint 16 of the adjacent cooling unit 10. As illustrated in FIG. 11, by attaching the spigot joint 15 and the socket joint 16 of the cooling unit 10 to the unit body 11 in a direction that is orthogonal to the coupling direction, and inserting and fitting the spigot joint 15 into the socket joint 16 in the direction, even if a pulling force (external force) along the coupling direction (X-axis direction) is applied to the cooling unit 10 due to some reasons, since the external force is perpendicularly applied to the spigot joint 15 and the socket joint 16, the spigot joint 15 hardly escapes from the socket joint 16. For example, even in a case where the cooling jacket 1 is pulled in the process of winding the cooling jacket 1 around the electric motor M, since the coupled state of the cooling unit 10 is secured, the workability for installation to the electric motor M can be improved. Of course, even if the external force along the thickness direction (Y-axis direction) is applied to the cooling unit 10, since the external force is perpendicularly applied to the spigot joint 15 and the socket joint 16, the spigot joint 15 hardly escapes from the socket joint 16.

When an external force is applied to a cooling unit 10 of the cooling jacket 1 along the direction (Z-axis direction) perpendicular to the coupling direction, since this direction is parallel to the direction in which the spigot joint 15 is inserted into the socket joint 16, there is a possibility that the spigot joint 15 escapes from the socket joint 16, and the cooling unit 10 is fallen from the cooling jacket 1.

Figure 11:
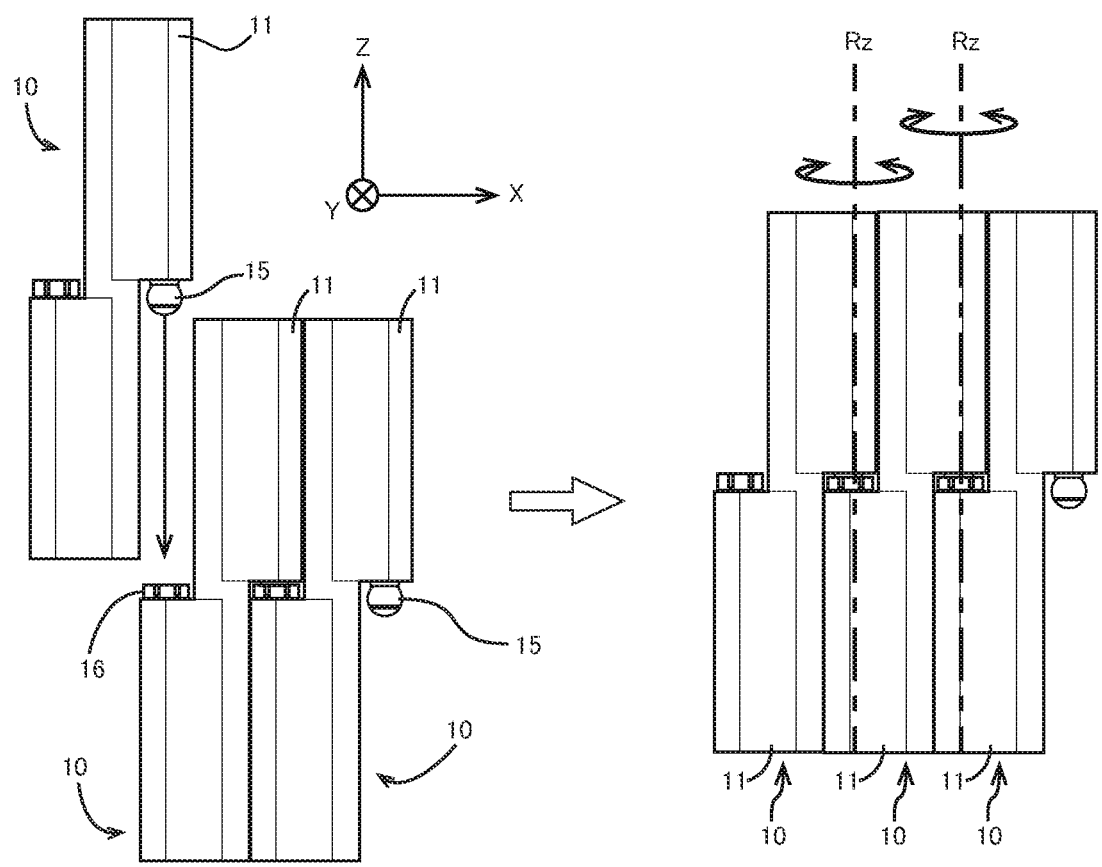
FIG. 11 is a front view illustrating a state where the cooling units of FIG. 3 are coupled to each other.

For example, as illustrated in FIG. 11, it is assumed that, for a certain reason, the external force is applied in the direction (Z-axis direction) perpendicular to the coupling direction to the cooling unit 10, which is the middle one of three adjacent cooling units 10 coupled to each other. These three cooling units 10 are arranged so that the steps provided in the opposite left and right directions engage with each other. The middle cooling unit 10 is pressed down from above by its left adjacent cooling unit 10, and is pressed up from below by its right adjacent cooling unit 10. Accordingly, even if a downward external force or an upward external force is applied to a certain cooling unit 10 in the direction (Z-axis direction) perpendicular to the coupling direction, independent movement of the cooling unit 10 is suppressed by the neighboring cooling units 10. Accordingly, falling of the cooling unit 10 along the direction (Z-axis direction) perpendicular to the coupling direction can be suppressed.

As illustrated in FIG. 8, the cooling unit body 11 includes therein a flow channel 12 through which a cooling medium is circulated. The flow channel 12 has a substantially S-shape that winds up and down, one end of the flow channel 12 communicates with the spigot joint insertion hole 13 formed in the step surface 11a, and the other end communicates with the socket joint insertion hole 14 formed in the step surface 11b. Since the flow channel 12 can be arranged over almost the entire area of the cooling unit body 11, it is possible to effectively cool the whole cooling unit body 11 with the cooling medium circulating through the flow channel 12.

Figure 10:
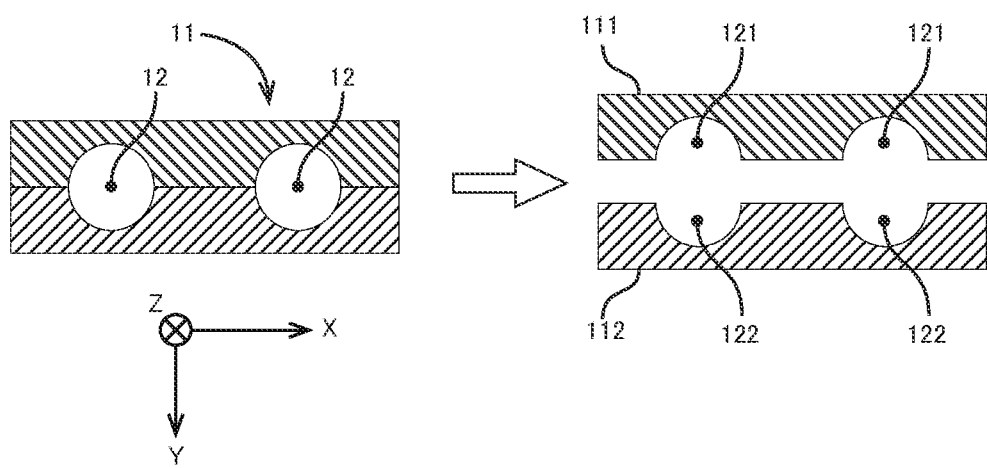
FIG. 10 is a B-B' end elevation view of FIG. 6.

As illustrated in FIG. 10, typically, the cooling unit body 11 is formed by joining, with an adhesive, etc., a first cooling unit body portion 111 and a second cooling unit body portion 112 to each other, which are obtained by halving the cooling unit body 11 in the thickness direction. Semicircular-shaped concave grooves 121 and 122 winding in the S-shape are provided in bonding surfaces of the first cooling unit body portion 111 and the second cooling unit body portion 112, respectively. When the first cooling unit body portion 111 and the second cooling unit body portion 112 are joined to each other, the grooves 121 and 122 constitute the flow channel 12 having a circular-shaped cross-section. In this manner, by directly forming the flow channel 12 in the cooling unit body 11, the cooling medium circulating through the flow channel 12 directly exchanges heat between the first cooling unit body portion 111 and the second cooling unit body portion 112. Therefore, compared with a case where a separate pipe, etc. is housed in the cooling unit body 11 as the flow channel 12, it is possible to improve the cooling effect by the cooling medium circulating through the flow channel 12.

As illustrated in FIG. 8 and FIG. 9, in order to communicate the flow channels 12 inside the adjacent cooling units 10 to each other, the spigot joint 15 and the socket joint 16 are provided with through-holes 152 and 162 that penetrate through the inside of these joints up and down, respectively. As illustrated in FIG. 9, the width of the through-hole 152 of the spigot joint 15 is slightly narrower than the width of the through-hole 162 of the socket joint 16. Accordingly, even when the cooling unit 10 is rotated a little about an axis parallel to the Y axis for a certain reason, it is possible to avoid that the cooling medium circulating the through-hole 152 of the spigot joint 15 directly hits the inner surface of the socket joint 16, and the flow of the cooling medium from the through-hole 152 of the spigot joint 15 to the through-hole 162 of the socket joint 16 is not prevented. That is, leakage of the cooling medium from the joint portions can be suppressed.

As illustrated in FIG. 9, an annular elastic member, a sealing member such as a so-called O ring, is applied for stopping leakage of the cooling medium from the joint portion. A circular ring slit 153 is formed in the outer bottom surface of the spigot joint 15, and an O ring 100 is fitted in this slit 153. Since this O ring 100 is pressure welded to the bottom surface of the spigot joint insertion hole 13, leakage of the cooling medium from between the spigot joint 15 and the spigot joint insertion hole 13 can be suppressed.

A circular ring slit 163 is provided in the bottom surface of the socket joint 16, and an O ring 101 is fitted in this slit 163. The O ring 101 is pressure welded to the bottom surface of the socket joint insertion hole 14. Accordingly, leakage of the cooling medium from between the socket joint 16 and the socket joint insertion hole 14 is suppressed.

A circular ring slit 154 is provided in the outer periphery surface of the spherical-shaped protrusion 151 of the spigot joint 15, and an O ring 102 is fitted in this slit 154. The O ring 102 is pressure welded to the inner periphery surface of the concave portion 161 of the socket joint 16. Accordingly, leakage of the cooling medium from between the spigot joint 15 and the socket joint 16 is suppressed.

The above-described cooling jacket 1 according to the first embodiment consists of a plurality of cooling units 10 coupled to each other so as to be bendable about the Z axis orthogonal to the coupling direction, and can be wound around the outer surface of the electric motor M, which is a polygonal column, with the coupling unit 10 being in a closely contacting manner. The electric motor M can be efficiently cooled, since the contact area between the cooling jacket 1 and the electric motor M is increased. Additionally, since the cooling jacket 1 is an assembly type, and the coupling structure of the cooling units is a fitting structure by the joints, the number of the cooling units 10 constituting the cooling jacket 1 can be easily increased or decreased, and it is possible to flexibly correspond to the size of the electric motor M to be cooled. Further, since the cooling unit 10 is obtained by merely installing the spigot joint 15 and the socket joint 16 to the cooling unit body 11, the number of components is small, and assemblability is also high. Additionally, replacement cost is also suppressed, since only a component in which a fault has occurred may be replaced. In addition, when the positions and orientations of the spigot joint 15 and the socket joint 16 in the cooling unit 10 are the same, cooling units including cooling unit bodies having different sizes and shapes can be used for the cooling jacket 1. For example, a cooling unit having a reduced total width of the cooling unit body 11, a cooling unit having an increased total width, a cooling unit having an increased total length, and a cooling unit having a reduced total length can be included in the cooling jacket 1. By constituting the cooling jacket 1 by combining a plurality of kinds of cooling units according to the contour of an object to be cooled, the adhesion property to the object to be cooled can be improved, and the cooling effect can be increased. When a plurality of kinds of cooling units are prepared in advance, an operator can easily assemble a cooling jacket having a high cooling effect according to the object to be cooled on site.

Figure 12:
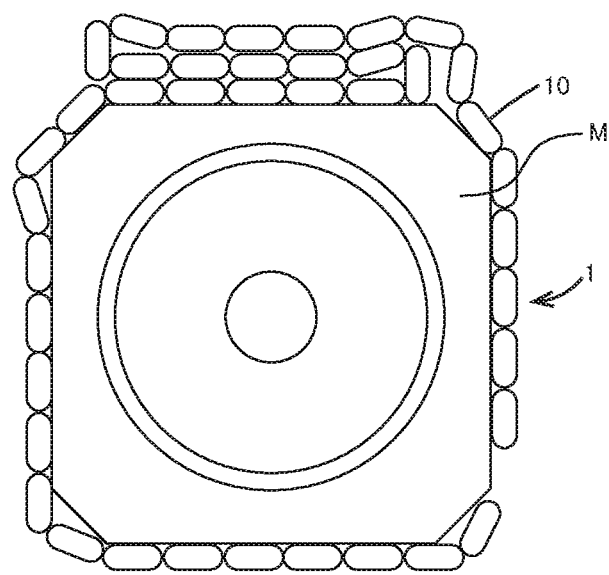
FIG. 12 is a perspective view illustrating another usage example of the cooling jacket of FIG. 1.

Note that, as illustrated in FIG. 12, a middle portion of the cooling jacket 1 according to the first embodiment can be folded for use, in order to arrange the cooling unit 10 in a double fold or a triple fold on a part where heat is concentrated, or on the surface of a portion where heat is accumulated.

Figure 13:
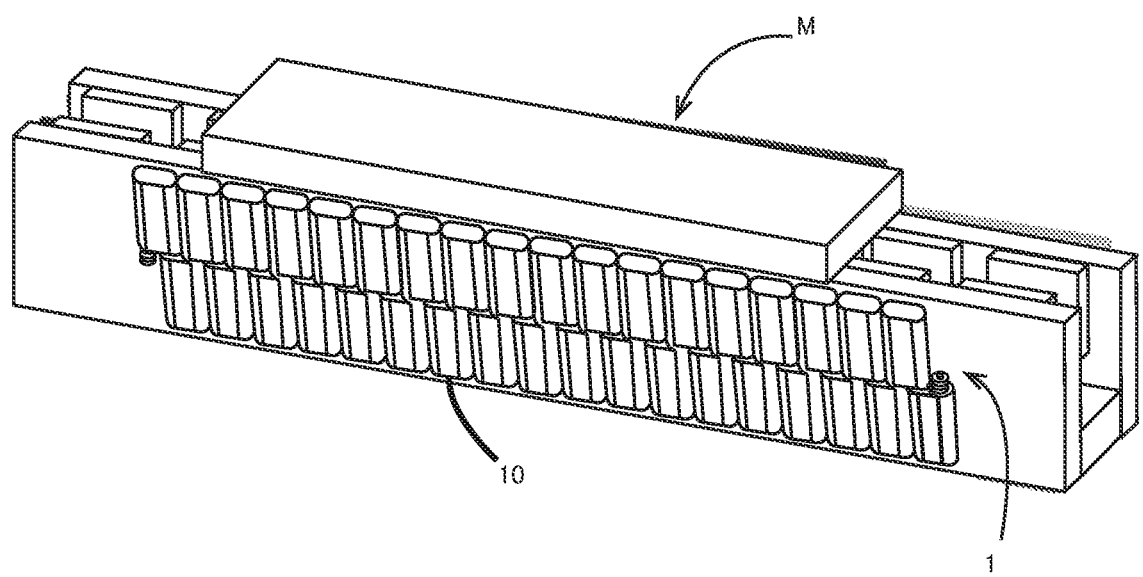
FIG. 13 is a front view illustrating another usage example of the cooling jacket of FIG. 1.

Additionally, as illustrated in FIG. 13, since the cooling units 10 are rotatably connected in the cooling jacket 1 according to the first embodiment, it is possible to freely change the form of the cooling jacket 1, and thus to match the cooling jacket 1 to various-sized rotary type electric motors M, which are polygonal columns. However, it is further possible to freely match the cooling jacket 1 to electric motors of other types. For example, as illustrated in FIG. 13, it is also possible to install the cooling jacket 1 according to the first embodiment to a direct-acting electric motor, a so-called linear motor M1, by providing the cooling jacket 1 in a linearly spread manner.

Note that although, in the first embodiment, the spigot joint 15 includes the spherical-shaped protrusion 151, and the socket joint 16 includes the spherical-surfaced concave portion 161 for receiving the spherical-shaped protrusion 151, the cooling jacket 1 is generally permitted to be rotated only about the Z axis. Therefore, the protrusion 151 of the spigot joint 15 may be cylindrical, and the concave portion 161 of the socket joint 16 for receiving this may also have a cylindrical inner surface.

Note that, in terms of the replacement cost of components of the cooling jacket 1 and the assemblability of the cooling jacket 1, it is desirable to fasten the spigot joint 15 (socket joint 16) to the spigot joint insertion hole 13 (socket joint insertion hole 14) by screwing. However, at least the spigot joint 15 (socket joint 16) may be fixed to the spigot joint insertion hole 13 (socket joint insertion hole 14), and the method of fixing is not limited to screwing. For example, the spigot joint 15 (socket joint 16) may be fixed to the spigot joint insertion hole 13 (socket joint insertion hole 14) by adhesion.

Figure 14:
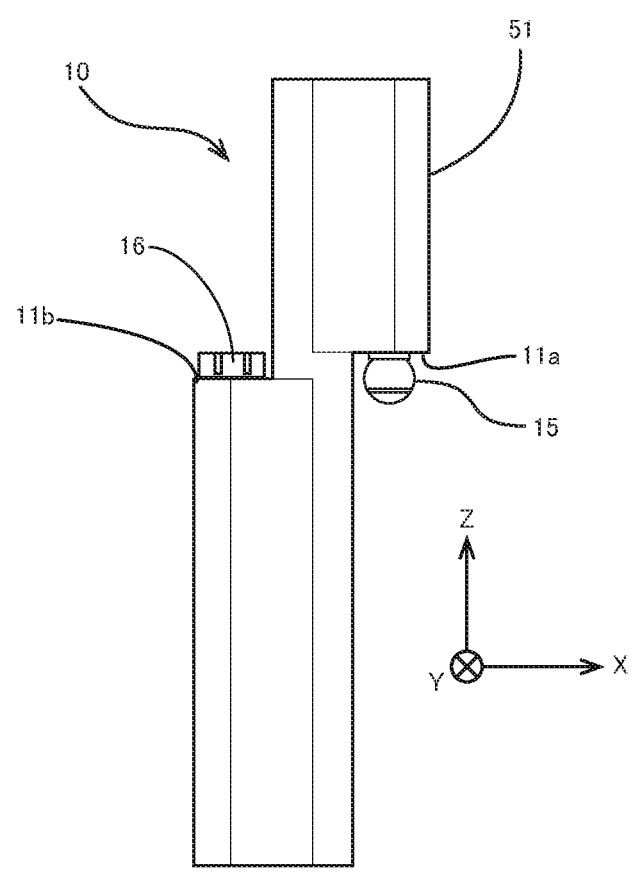
FIG. 14 is a front view illustrating a modification of the cooling unit of FIG. 4.

In terms of securing the rigidity of the cooling jacket 1, it is desirable that the connection part of the cooling unit bodies is in the vicinity of the center of the length. Additionally, in terms of the ease of manufacturing of the cooling jacket 1, it is desirable that the cooling unit body 11 is a rotating object. However, this does not deny that the position of the connection part of the cooling unit bodies is shifted upward or downward from the center of the length. That is, the height difference (distance) between the upper end surface of the cooling unit body 11 and the step surface 11a may not be equal to the height difference (distance) between the lower end surface and the step surface 11b. As illustrated in FIG. 14, for example the height difference (distance) between the upper end surface of the cooling unit body 11 and step surface 11a can be slightly longer than about ⅓ of the entire length of the cooling unit body 11, and the height difference (distance) between the lower end surface and the step surface 11b can be slightly longer than about ⅔ of the entire length of the cooling unit body 11.

Figure 15:
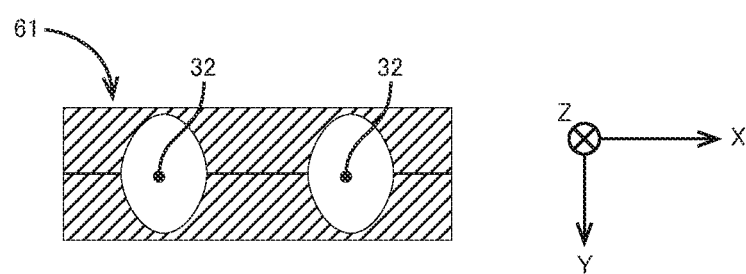
FIG. 15 is an end elevation view illustrating a modification of the cooling unit of FIG. 10.

The cross-sectional shape of the flow channel 12 inside the cooling unit 10 is not limited to the circular shape. As illustrated in FIG. 15, for example, the cross-sectional shape of the flow channel 12 of the cooling unit 10 can be an oval shape. Additionally, although not illustrated, the cross-sectional shape of a portion of the flow channel 12 may be different from the cross-sectional shape of another portion. Further, in terms of cooling the whole cooling unit 10, it is desirable that the flat surface shape of the flow channel 12 is a substantially S-shape that winds up and down. However, there are a case where it is desired to cool not the entire contact surface where the cooling unit body 11 contacts the electric motor M, but only a portion of the contact surface, and a case where it is desired to further cool a portion of the contact surface. In such cases, it is possible to freely design the flow channel 12 of the cooling unit 10, such as to arrange the flow channel 12 in a concentrated manner on a portion to be cooled.

Second Embodiment

Figure 16:
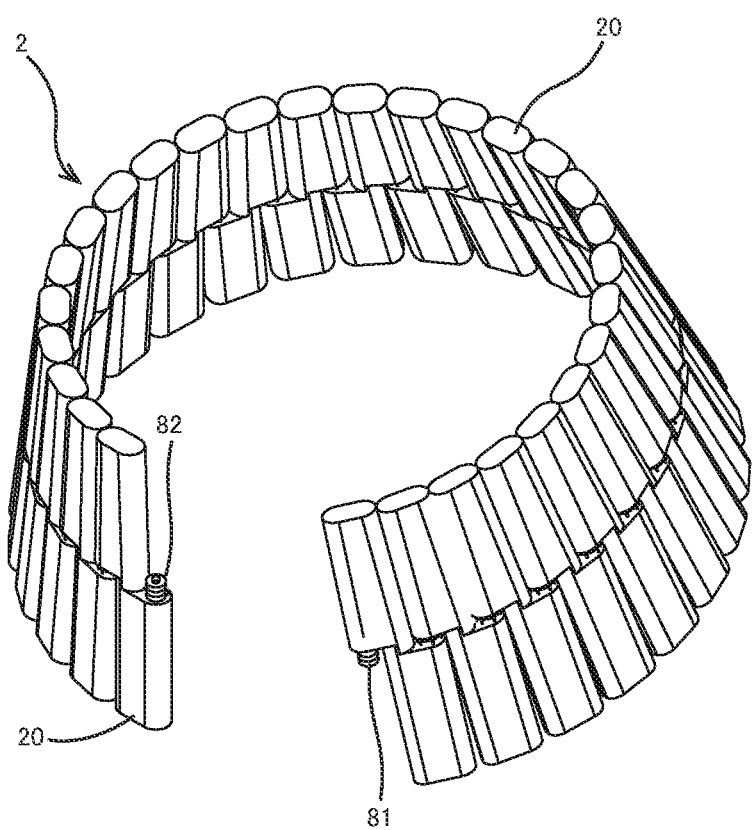
FIG. 16 is a perspective view illustrating a cooling jacket according to a second embodiment.

Hereinafter, referring to FIG. 16 to FIG. 19, a cooling jacket 2 according to a second embodiment will be described. As illustrated in FIG. 16, the cooling jacket 2 according to the second embodiment can be modified into a polygonal frustum shape, so as to be able to be preferably used as a member for cooling the electric motor M, which is a polygonal pyramid. The structural difference between the cooling jacket 1 according to the first embodiment and the cooling jacket 2 according to the second embodiment is in the shape of the cooling unit, and the other structure is the same as that of the first embodiment. Accordingly, a description of those other than a cooling unit body 21 of a cooling unit 20 constituting the cooling jacket 2 according to the second embodiment will be omitted.

Figure 17:
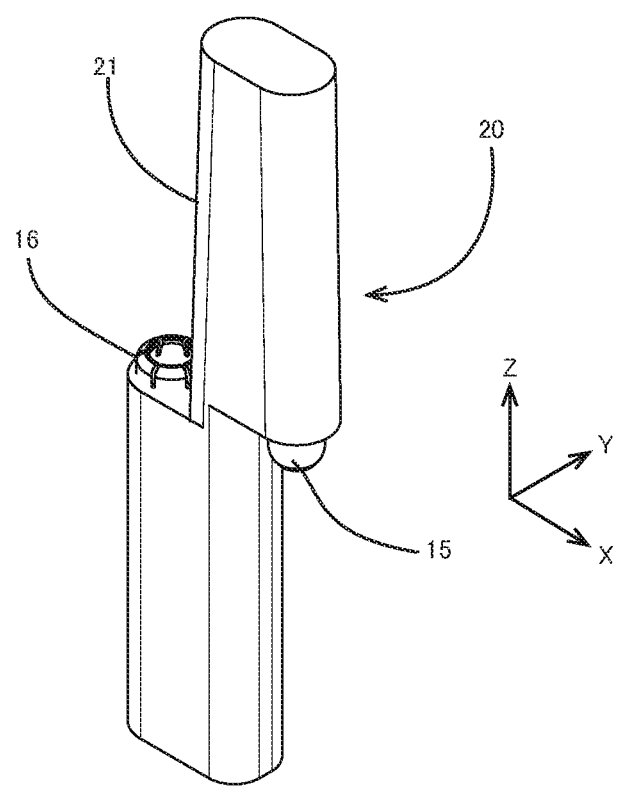
FIG. 17 is a perspective view illustrating the cooling unit of FIG. 16.
Figure 18:
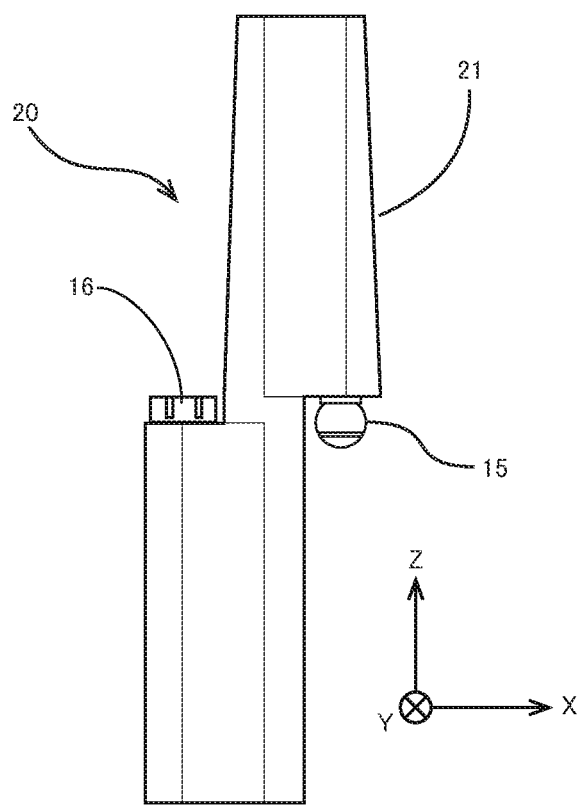
FIG. 18 is a front view of the cooling unit of FIG. 17.
Figure 19:
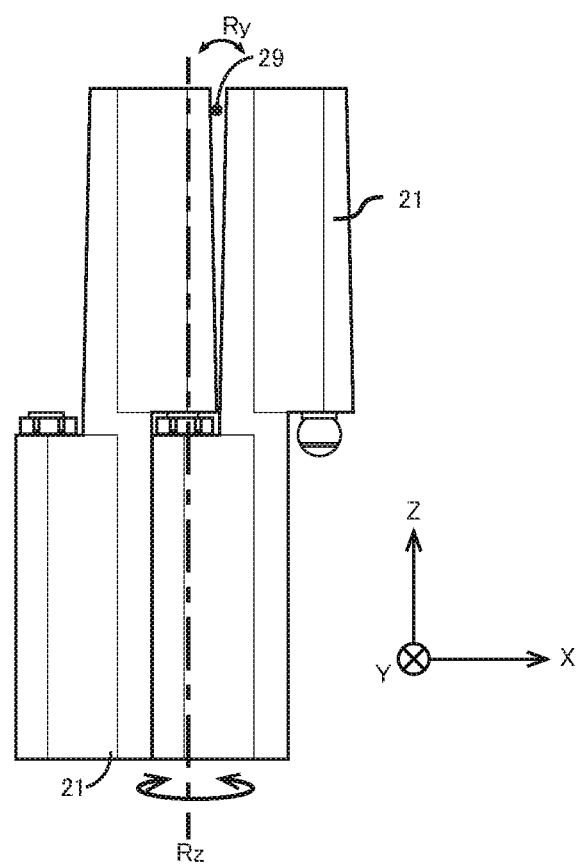
FIG. 19 is a front view illustrating a state where the cooling units of FIG. 17 are coupled to each other.

As illustrated in FIG. 17 and FIG. 18, the cooling unit body 21 has a tapered shape in which its width gradually becomes narrower toward the upper end surface from the center portion of the length. As illustrated in FIG. 19, in a state where the cooling unit bodies are connected to each other via the joints, a gap 29 is generated between the cooling unit bodies 21 in a part upper than the connection part. This gap 29 permits slight rotation about an axis Ry that is parallel to the thickness direction of the cooling unit 20.

Accordingly, as illustrated in FIG. 16, the cooling jacket 2 can be modified into the polygonal frustum shape in which the upper portion is made narrower than the lower portion.

The cooling jacket 2 according to the second embodiment described above produces the same effects as the cooling jacket 1 according to the first embodiment, and especially, the cooling jacket 2 can be made to closely contact the outer surface of the electric motor M, which is a polygonal pyramid, and can effectively cool the electric motor M.

Third Embodiment

Figure 20:
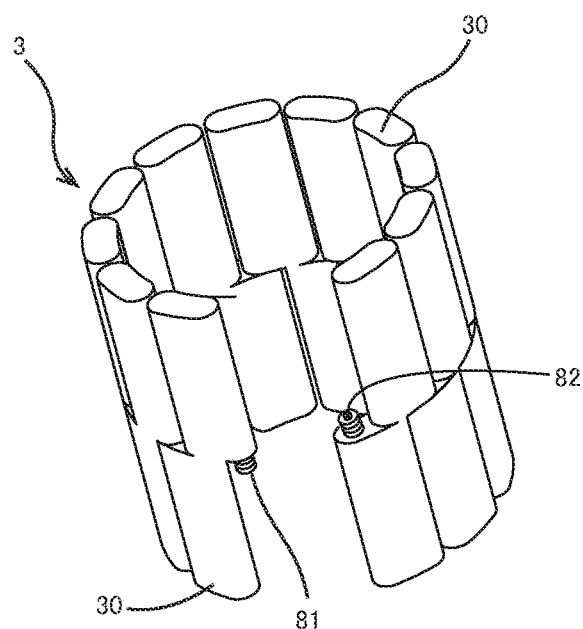
FIG. 20 is a perspective view illustrating the cooling jacket according to the second embodiment.
Figure 21:
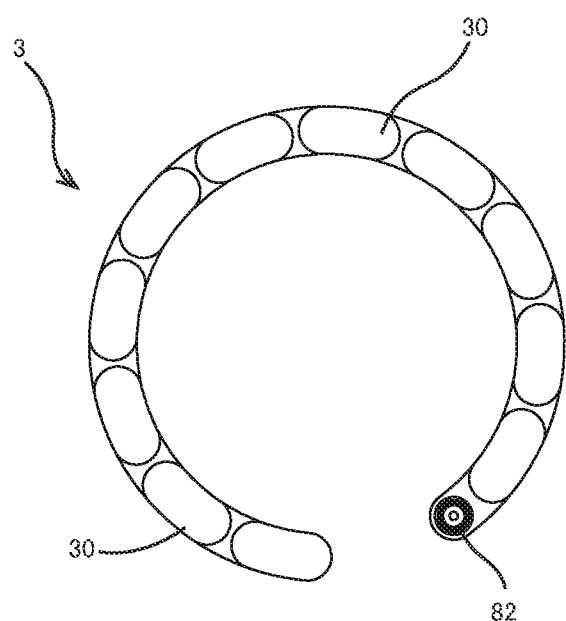
FIG. 21 is a front view of the cooling jacket of FIG. 20.

Hereinafter, referring to FIG. 20 to FIG. 23, a cooling jacket 3 according to a third embodiment will be described. As illustrated in FIG. 20 and FIG. 21, the cooling jacket 3 according to the third embodiment can be preferably used as a member for cooling the electric motor M, which is a cylindrical body. The structural difference between the cooling jacket 1 according to the first embodiment and the cooling jacket 3 according to the third embodiment is in the shape of the cooling unit, and the other structure is the same as that of the first embodiment. Accordingly, a description of those other than the cooling unit body 31 of the cooling unit 30 constituting the cooling jacket 3 according to the third embodiment will be omitted.

Figure 22:
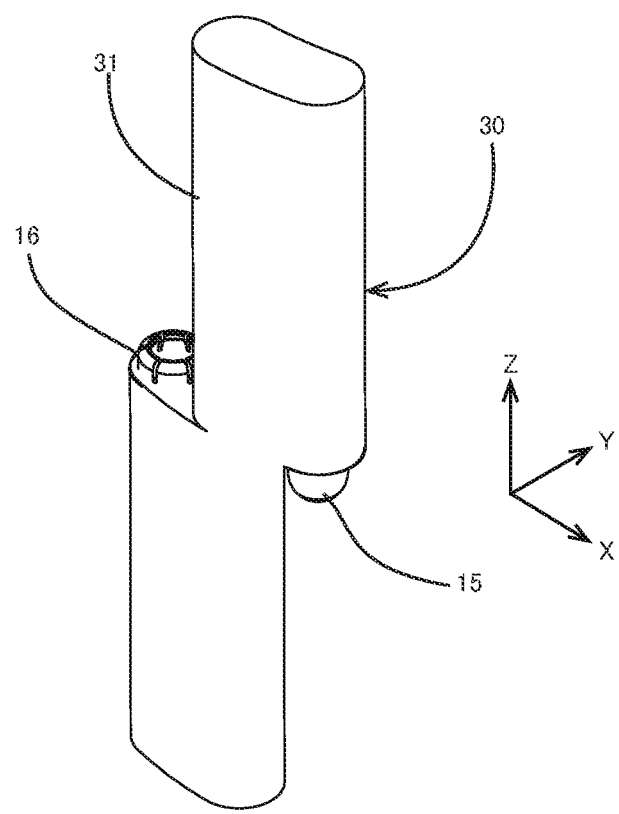
FIG. 22 is a perspective view illustrating the cooling unit of FIG. 20.
Figure 23:
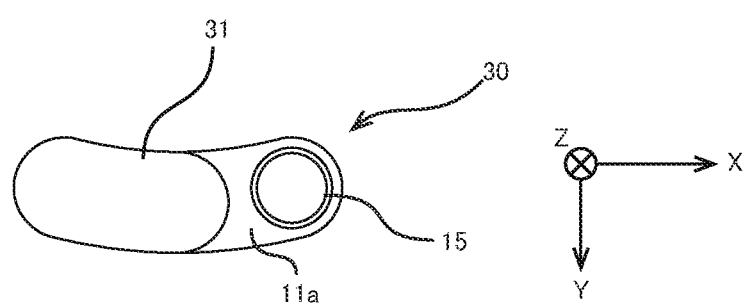
FIG. 23 is a plan view of the cooling unit of FIG. 22.

As illustrated in FIG. 22 and FIG. 23, the cooling unit body 31 has a curved plate shape. Therefore, by adjusting the rotation angles of the cooling units 30, as illustrated in FIG. 21, the inner periphery surface of the cooling jacket 3 forms a circular shape. Accordingly, the cooling jacket 3 according to the third embodiment produces the same effects as the cooling jacket 1 according to the first embodiment, and especially, the cooling jacket 3 can be made to closely contact the outer surface of the electric motor M, which is a cylindrical body, and can effectively cool the electric motor M.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An electric motor cooling jacket for cooling an electric motor, having a plurality of cooling units coupled in a row, each of the cooling units comprising:
   a plate-shaped cooling unit body including therein a flow channel for a cooling medium;
   a socket joint attached to the cooling unit body to extend from one end of the flow channel; and
   a spigot joint attached to the cooling unit body to extend from one end of the flow channel,
   wherein the spigot joint is fitted to the socket joint to connect the cooling units to each other,
   the socket joint has a spherical-shaped or cylindrical inner surface, and the spigot joint has a spherical-shaped or cylindrical outer surface that matches the inner surface of the socket joint to detachably connect the cooling units to each other and be rotatable around an axis orthogonal to a coupling direction of the cooling units, and
   the socket joint and the spigot joint are provided with through-holes that penetrate through the socket joint and the spigot joint, respectively, to communicate with the flow channels of the cooling units.

2. The electric motor cooling jacket according to claim 1, wherein the socket joint and the spigot joint are attached to the cooling unit body with an orientation that is orthogonal or inclined to the coupling direction of the cooling units.

3. The electric motor cooling jacket according to claim 1, wherein the cooling unit body is stepped in a substantially Z-shape in front view, and includes a pair of step surfaces that are parallel to the coupling direction of the cooling units, and that face directions opposite to each other,
   the socket joint is perpendicularly attached to one step surface of the pair of step surfaces, and
   the spigot joint is perpendicularly attached to the other step surface of the pair of step surfaces.

4. The electric motor cooling jacket according to claim 1, further comprising an annular elastic member that is fitted in an outer periphery surface of the spigot joint, and contacts an inner surface of the socket joint.

5. The electric motor cooling jacket according to claim 1, wherein both side surfaces of the cooling unit body form arc shapes, and
   the cooling unit bodies are densely arranged so that the side surfaces of the cooling unit bodies adjacent to each other face to each other.

6. The electric motor cooling jacket according to claim 1, wherein the cooling unit body has a curved plate shape.

7. The electric motor cooling jacket according to claim 1, wherein the cooling unit body has a tapered shape whose width becomes narrower along a direction orthogonal to the coupling direction.

8. A cooling unit constituting an electric motor cooling jacket for cooling an electric motor, the cooling unit comprising:
   a plate-shaped cooling unit body including therein a flow channel for a cooling medium;
   a socket joint attached to the cooling unit body to extend from one end of the flow channel; and
   a spigot joint attached to the cooling unit body to extend from one end of the flow channel,
   wherein the spigot joint is fitted to the socket joint to connect the cooling unit to another cooling unit,
   the socket joint has a spherical-shaped or cylindrical inner surface, and the spigot joint has a spherical-shaped or cylindrical outer surface that matches the inner surface of the socket joint to detachably connect the cooling unit to the another cooling unit and be rotatable around an axis orthogonal to a coupling direction of the cooling unit to the another cooling unit, and
   the socket joint and the spigot joint are provided with through-holes that penetrate through the socket joint and the spigot joint, respectively, to communicate with the flow channels of the cooling unit and the another cooling unit.

9. The cooling unit according to claim 8, wherein each of the socket joint and the spigot joint is attached to the cooling unit body with an orientation that is orthogonal or inclined to the coupling direction of the cooling units.

10. The cooling unit according to claim 8, wherein the cooling unit body is stepped in a substantially Z-shape in front view, and includes a pair of step surfaces that are parallel to the coupling direction of the cooling units, and that face directions opposite to each other,
   the socket joint is perpendicularly attached to one step surface of the pair of step surfaces, and the spigot joint is perpendicularly attached to the other step surface of the pair of step surfaces.

11. The cooling unit according to claim 8, further comprising an annular elastic member that is fitted in an outer periphery surface of the spigot joint, and contacts an inner surface of the socket joint.

12. The cooling unit according to claim 8, wherein both side surfaces of the cooling unit body form arc shapes.

13. The cooling unit according to claim 8, wherein the cooling unit body has a curved plate shape.

14. The cooling unit according to claim 8, wherein the cooling unit body has a tapered shape whose width becomes narrower along a direction orthogonal to the coupling direction.

* * * * *